United States Patent
Chen et al.

(10) Patent No.: US 11,797,269 B2
(45) Date of Patent: *Oct. 24, 2023

(54) APPARATUS AND METHODS FOR NEURAL NETWORK OPERATIONS SUPPORTING FLOATING POINT NUMBERS OF SHORT BIT LENGTH

(71) Applicant: Cambricon Technologies Corporation Limited, Beijing (CN)

(72) Inventors: Tianshi Chen, Beijing (CN); Shaoli Liu, Beijing (CN); Qi Guo, Beijing (CN); Yunji Chen, Bejing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 100 days.

This patent is subject to a terminal disclaimer.

(21) Appl. No.: 17/147,052

(22) Filed: Jan. 12, 2021

(65) Prior Publication Data
US 2021/0132904 A1    May 6, 2021

Related U.S. Application Data

(63) Continuation of application No. 16/174,084, filed on Oct. 29, 2018, now Pat. No. 10,936,284, which is a
(Continued)

(30) Foreign Application Priority Data

Apr. 28, 2016    (CN) .......................... 201610274809.2

(51) Int. Cl.
*G06F 7/483*    (2006.01)
*G06F 9/44*    (2018.01)
(Continued)

(52) U.S. Cl.
CPC ................ *G06F 7/483* (2013.01); *G06F 9/44* (2013.01); *G06N 3/063* (2013.01); *G06N 3/082* (2013.01); *G06N 3/084* (2013.01)

(58) Field of Classification Search
CPC .. G06F 7/483; G06F 2207/4824; G06F 7/575; G06N 3/063; G06N 3/082; G06N 3/084; G06N 3/02
(Continued)

(56) References Cited

U.S. PATENT DOCUMENTS 8,745,111 B2    6/2014    Ollmann

FOREIGN PATENT DOCUMENTS

CN    105468331 A    4/2016

OTHER PUBLICATIONS

Gupta et al., "Deep Learning with Limited Numerical Precision", Proceedings of the 32 nd International Conference on Machine Learning, vol. 37, Feb. 9, 2015, pp. 1-10.
(Continued)

*Primary Examiner* — Tan V Mai
(74) *Attorney, Agent, or Firm* — Getech Law LLC; Jun Ye (57) ABSTRACT

Aspects for neural network operations with floating-point number of short bit length are described herein. The aspects may include a neural network processor configured to process one or more floating-point numbers to generate one or more process results. Further, the aspects may include a floating-point number converter configured to convert the one or more process results in accordance with at least one format of shortened floating-point numbers. The floating-point number converter may include a pruning processor configured to adjust a length of a mantissa field of the process results and an exponent modifier configured to
(Continued)

adjust a length of an exponent field of the process results in accordance with the at least one format.

18 Claims, 7 Drawing Sheets

Related U.S. Application Data continuation-in-part of application No. PCT/CN2016/081846, filed on May 12, 2016.

(51) Int. Cl.
*G06N 3/063* (2023.01)
*G06N 3/082* (2023.01)
*G06N 3/084* (2023.01)

(58) Field of Classification Search
USPC .................................................. 708/204, 495
See application file for complete search history.

(56) References Cited

OTHER PUBLICATIONS

KR10-2018-7033951—Notice of Submission of Opinion, mailed May 28, 2022, 8 pages.
CN201610274809.2—First Office Action dated Jul. 13, 2020, 23 pages.
CN201610274809.2—Notice of Grant dated Jun. 2, 2021, 3 pages.
CN201610274809.2—Second Office Action dated Mar. 24, 2021, 8 pages.
CN201910154720.6—First Office Action dated Jul. 16, 2020, 24 pages.
CN201910154720.6—Notice of Grant dated Sep. 3, 2021, 3 pages.
CN201910154720.6—Second Office Action dated Apr. 1, 2021, 9 pages.
Courbariaux et al., "Training Deep Neural Networks With Low Precision Multiplications", Accepted as a workshop contribution at ICLR, arXiv:1412.7024v5, Sep. 23, 2015, 1-10 pages.
EP16899925.8—Communication pursuant to Article 94(3) EPC dated Feb. 17, 2021, 5 pages.
EP16899925.8—Communication pursuant to Article 94(3) EPC dated Jun. 23, 2020, 5 pages.
EP16899925.8—Communication under Rule 71(3) EPC dated Mar. 9, 2022, 60 pages.
EP16899925.8—Decision to grant a European patent pursuant to Article 97(1) EPC dated Jun. 30, 2022, 2 pages.
EP16899925.8—European Search Report dated Nov. 26, 2019, 4 pages.
Liu et al., "PuDianNao: A Polyvalent Machine Learning Accelerator", ASPLOS '15: Proceedings of the Twentieth International Conference on Architectural Support for Programming Languages and Operating Systems, pp. 369-381.
PCT/CN2016/081846- International Search Report and Written Opinion dated Feb. 7, 2017, 15 pages.
Pete Warden, "Why are Eight Bits Enough for Deep Neural Networks?", XP055642611, Retrieved from the Internet URL:https://petewarden.com/2015/05/23/why-are-eight-bits-enough-for-deep-neural-networks, May 23, 2015, 6 pages.

APPARATUS AND METHODS FOR NEURAL NETWORK OPERATIONS SUPPORTING FLOATING POINT NUMBERS OF SHORT BIT LENGTH

INCORPORATION BY REFERENCE

This application is a continuation of U.S. patent application Ser. No. 16/174,084, filed Oct. 29, 2018, which is claims priority to International Patent Application No. PCT/CN2016/081846, filed May 12, 2016, which claims the benefit of priority to Chinese Patent Application No. 201610274809.2 filed Apr. 28, 2016. The entire content of each of the aforementioned patent applications is incorporated herein by reference.

BACKGROUND

High dynamic range computing has become increasingly important in applications of various fields recently. Comparing with fixed-point numbers, floating-point numbers of an equivalent bit length have wider dynamic range and receive more attention. A bit length may refer to a given length of bits that are used to represent a data group hereinafter. As a result, floating-point number processors are often implemented as a part of a primary processor or as a coprocessor for the primary processor.

The implementation of floating-point numbers may result in more complicated computations. Thus, a solution that may speed up floating-point number computations while lowering power consumption has become a key issue in hardware design.

Conventionally, general-purpose processors are often configured to perform computations of floating-point numbers. However, general-purpose processors may be limited to computing floating-point numbers of a single format. One single format may be sufficient for some applications in terms of accuracy and dynamic range but it might not be necessary for other applications. For example, neural network algorithms may not require a high accuracy for floating-point numbers with an exponent field of a greater bit length but may prefer a high accuracy for floating-point numbers with a smaller exponent (weights or the weight variables and gradients in backward propagation algorithm). In the example of neural network algorithms, activation functions such as sigmoid function and tan h function are non-linear and, thus, input data with different levels of accuracy do not show significant difference after treated by activation functions. Therefore, the input data represented in floating-point numbers of high accuracy may cause unnecessary power consumption.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for neural network operations with floating-point number of short bit length. The example apparatus may include a neural network processor configured to process one or more floating-point numbers to generate one or more process results. Further, the example apparatus may include a floating-point number converter configured to convert the one or more process results in accordance with at least one format of shortened floating-point numbers. The floating-point number converter may include a pruning processor configured to adjust a length of a mantissa field of the process results and an exponent modifier configured to adjust a length of an exponent field of the process results in accordance with the at least one format.

Another example aspect of the present disclosure provides an example method for neural network operations with floating-point number of short bit length. The example method may include processing, by a neural network processor, one or more floating-point numbers to generate one or more process results. Further, the example method may include converting, by a floating-point number converter, the one or more process results in accordance with at least one format of shortened floating-point numbers. The converting may further include adjusting, by a pruning processor, a length of a mantissa field of the process results and adjusting, by an exponent modifier a length of an exponent filed of the process results in accordance with the at least one format.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
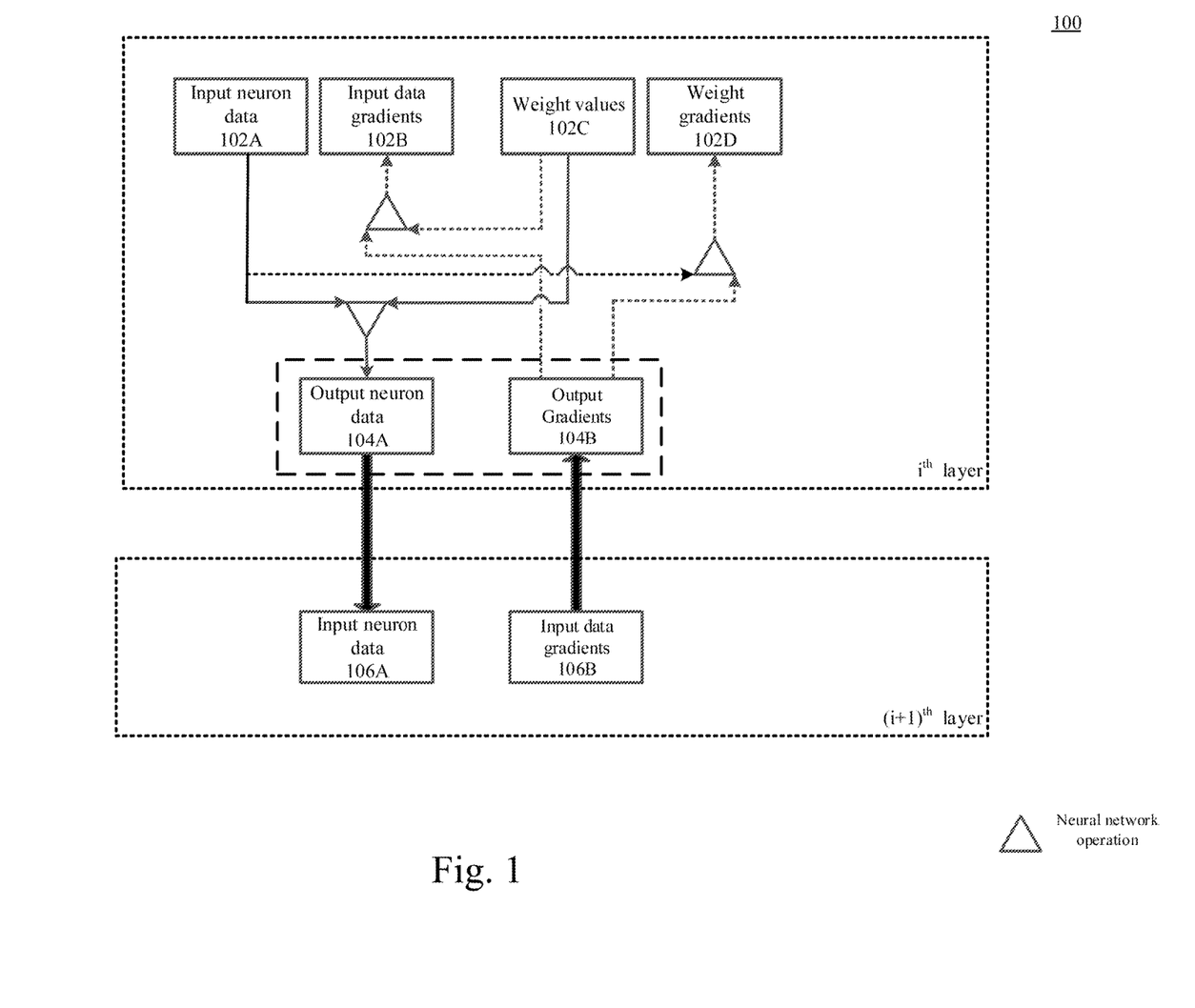
FIG. 1 is a block diagram illustrating an example forward propagation process and an example backpropagation process in a neural network.

FIG. 1 is a block diagram illustrating an example forward propagation process and an example backpropagation process (collectively, computing process 100) in a neural network. The computing process 100 is a merely example showing neural network operations that involve input data and weight values and is not limited to such operations. For example, other unshown neural network operations may include pooling operations, etc. Since convolution operation may be a major operation in the computing process 100, the illustrated multilayer neural network may be also referred to as a convolutional neural network.

As depicted, the example computing process 100 may be performed from the $i^{th}$ layer to the $(i+1)^{th}$ layer. The term "layer" here may refer to a group of operations, rather than a logic or a physical layer. A triangular-shaped operator (A as shown in FIG. 1) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire computing process. Rather, the layers of operations may refer to any two consecutive layers in a neural network. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 102A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 102A may be multiplied or convolved by one or more weight values 102C. The weight values 102C, stored as weight vectors, may also be referred to as a convolution kernel. The results of the multiplication or convolution may be transmitted as output neuron data 104A. In some examples, an activation function may be applied to the output neuron data 104A. The output neuron data 104A may be transmitted to the next layer (e.g., the $(i+1)^{th}$ layer) as input neuron data 106A. The forward propagation process may be shown as the solid lines in FIG. 1.

The backward propagation process may start from the last layer of the forward propagation process. For example, the backward propagation process may include the process from the $(i+1)^{th}$ layer to the $i^{th}$ layer. During the process, the input data gradients 106B may be transmitted to the $i^{th}$ layer as output gradients 104B. The output gradients 104B may then be multiplied or convolved by the input neuron data 102A to generate weight gradients 102D. Additionally, the output gradients 104B may be multiplied by the weight values 102C to generate input data gradients 102B.

Data in the computing process 100 may be floating-point numbers. The floating-point numbers may be represented as $(-1)^S \times (1+M) \times 2^E$, in which S denotes the sign of the corresponding floating-point number, M denotes the mantissa of the corresponding floating-point number, and E denotes the exponent of the corresponding floating-point number.

Different types of floating-point numbers at different layers of the computing process 100 may be of different accuracy. For example, most of the input neuron data 102A in the $i^{th}$ layer may be around $1.0 \times 2^{-4}$ and most of the weight values in the $i^{th}$ layer may be around $1.0 \times 2^{-8}$. Most of the input neuron data 106A in the $(i+1)^{th}$ layer may be, for example, between $1.0 \times 2^{-10}$ to $2.0 \times 2^{-9}$. Thus, a single format may not be appropriate for the different types of floating-point numbers at the different layers. For example, a floating-point number that includes 8 bits of exponent may provide excessive accuracy for most of the input neuron data 102A in the $i^{th}$ layer.

In some examples, the data in the computing process 100 may be categorized based on the different types and the different layers. A format may be determined for each category of the floating-point numbers. Each format may include a sign bit, a bit length limit of the exponent, a bit length of the mantissa, an offset value.

Figure 2:
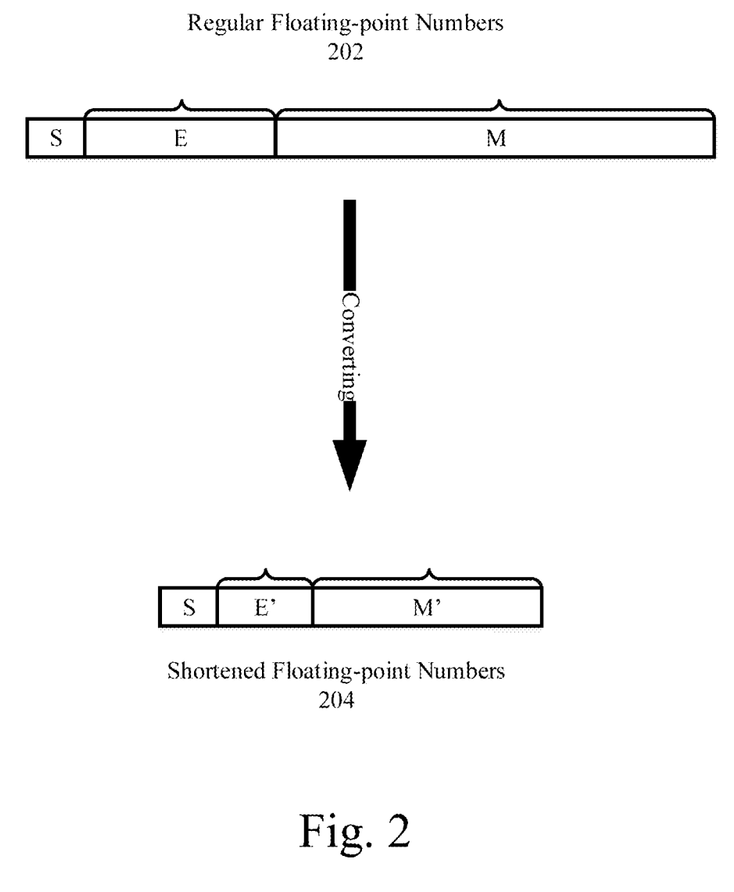
FIG. 2 is a block diagram illustrating an example converting process between first floating-point numbers and second floating-point numbers.

FIG. 2 is a block diagram illustrating an example converting process between first floating-point numbers and second floating-point numbers.

As depicted, regular floating-point numbers 202 may include one sign bit, one or more bits for the exponent field, and one or more bits for the mantissa field. For example, the format of a 32-bit floating-point number of IEEE754 standard may include one sign bit, eight bits for the exponent field, and twenty-three bits for the mantissa field. The regular floating-point numbers may be converted into shortened floating-point numbers in accordance with one or more formats determined based on the type of the data and the layers of operation, in which the data is processed or generated. In more detail, the exponent field and the mantissa field of the regular floating-point numbers 202 may be adjusted to include fewer bits.

The shortened floating-point numbers 204, as shown, may include a sign bit, one or more bits for the adjusted exponent field, and one or more bits for the adjusted mantissa field. The adjusted exponent field ("E'" as shown) may include fewer bits than the exponent field of the regular floating-point numbers 202. Similarly, the adjusted mantissa field ("M'" as shown) may include fewer bits than the mantissa field of the regular floating-point numbers 202. In addition, the shortened floating-point numbers 204 may include an offset value or a bias value. For example, the shortened floating-point numbers 204 may be represented as $(-1)^S \times$ $(1+M')\times 2^{E'+offset}$. In some other examples, the shortened floating-point numbers 204 may be represented as $(-1)^S \times (1+M')\times 2^{E'+offset}$ bias.

Figure 3:
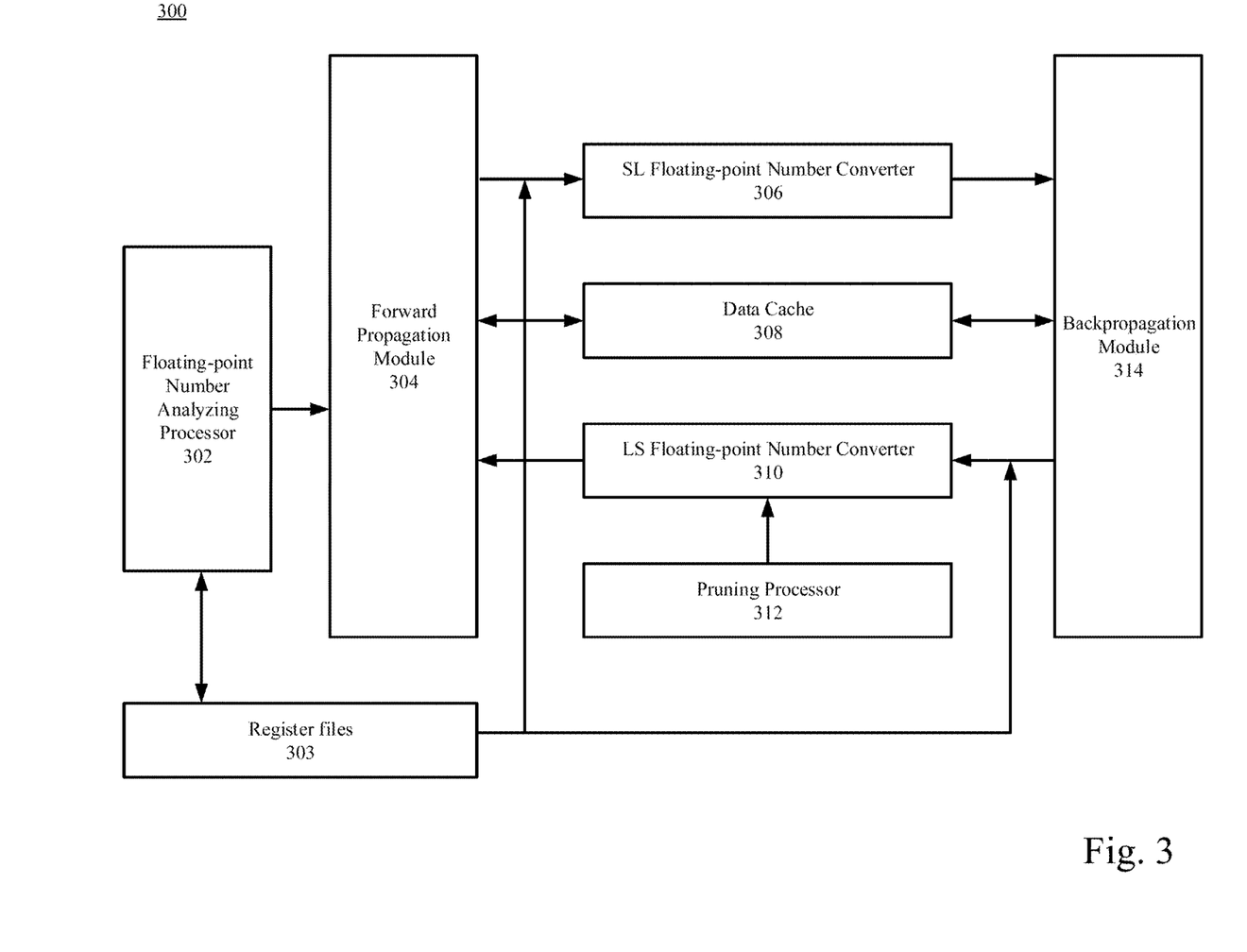
FIG. 3 is a block diagram illustrating an example device by which the example forward propagation process and the example backpropagation process may be implemented.

FIG. 3 is a block diagram illustrating an example device by which the example forward propagation process and the example backpropagation process may be implemented.

As depicted, a floating-point number analyzing processor 302 may be configured to collect the data involved or generated in different layers of the computing process 100. The data may be categorized based on the type and the layers. In other words, data of a same type in a same layer may be grouped together as a category.

Further, the floating-point number analyzing processor 302 may be configured to statistically analyze the categories of floating-point numbers to determine a data range for the data in each category and a distribution pattern of the data in each category over one or more subranges of the data range.

For example, with respect to the input neuron data 102A in the $i^{th}$ layer, the floating-point number analyzing processor 302 may determine that the data are within a range, e.g., between $1.0\times 2^{-4}$ and $1.0\times 2^4$. The range may further include subranges such as from $1.0\times 2'$ to $1.0\times 2^{-3}$. In some example, the floating-point number analyzing processor 302 may be configured to calculate the percentile of data within each subrange, e.g., 99.6% of the input neuron data 102A are between $1.0\times 2^{-4}$ and $1.0\times 2^{-3}$.

Further, the floating-point number analyzing processor 302 may determine a format such that floating-point numbers in accordance with the format can represent at least a predetermined percentage of the category of data. For example, the predetermined percentage may be preset as 99.5%. Thus, the bit lengths of the exponent field and the mantissa field may be adjusted such that shortened floating-point numbers in the determined format may represent at least 99.5% of the input neuron data 102A.

The determined format, as described in accordance with FIG. 2, may include parameter such as a bit length limit for the mantissa field, a bit length limit for the exponent field, an offset value, and a bias value. The bit length limit for the mantissa field, the bit length limit for the exponent field, the offset value, and the bias value may be stored in register files 303. The locations or addresses of the respective registers that store the above parameter may be transmitted to an SL floating-point number converter 306 and an LS floating-point number converter 310.

According to the formats, the data for the forward propagation process may be converted and input to a forward propagation module 304. The forward propagation module 304 may be configured to perform operations in the forward propagation process. As described above, the operations may include multiplication or convolution between the input neuron data 102A and the weight values 102C. In some examples, the weight values 102C and bias values may not be converted into shortened floating-point numbers. Rather, the weight values 102C and the bias values may be stored in a data cache 308 as regular floating-point numbers for future backpropagation process.

During the forward propagation process, multiple intermediate results may be generated and temporarily stored in the data cache. In some examples, the intermediate results may be formatted as regular floating-point numbers and may be fed back to the forward propagation module 304 for further processing. In other words, the forward propagation module 304 may be capable of processing both regular floating-point numbers and shortened floating-point numbers.

The forward propagation process, when completed, may yield one or more process results, e.g., output neuron data 104A. According to the format determined for the type of data in a corresponding layer, the process results may be converted to shortened floating-point numbers. In more detail, the mantissa field and the exponent field of the process results may be respectively adjusted.

The adjusted process results may be transmitted to a backpropagation module 314 for the backpropagation process. Prior to the backpropagation process, the SL floating-point number converter 306 may be configured to convert the adjusted process results to regular floating-point numbers. For example, the SL floating-point number converter 306 may be configured to supplement one or more bits of zero to the exponent field and the mantissa field of the adjusted process results.

Results of the backpropagation process may be transmitted to the LS floating-point number converter 310. The LS floating-point number converter 310, together with a pruning processor 312, may be configured to convert the results of the backpropagation process to shortened floating-point numbers.

Figure 4:
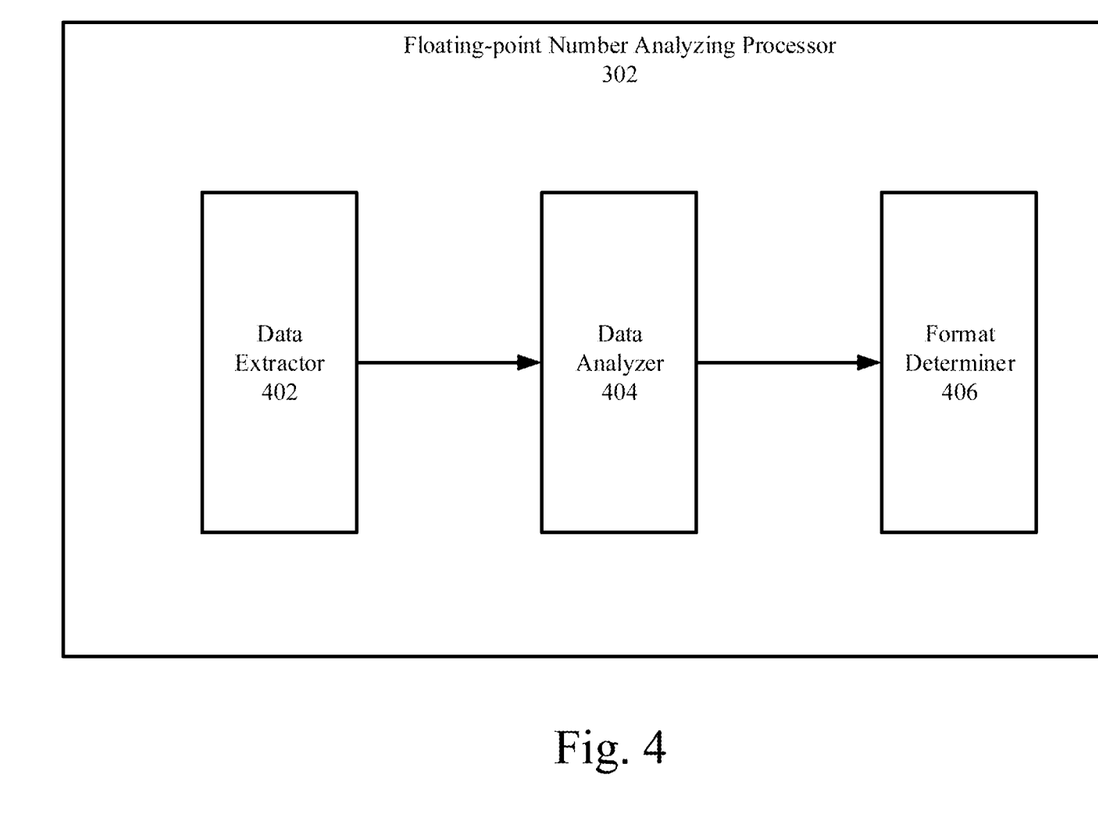
FIG. 4 is a block diagram illustrating an example floating-point number analyzing processor by which the example forward propagation process and the example backpropagation process may be implemented.

FIG. 4 is a block diagram illustrating an example floating-point number analyzing processor 302 by which the example forward propagation process and the example backpropagation process may be implemented.

As depicted, the example floating-point number analyzing processor 302 may include a data extractor 402, a data analyzer 404, and a format determiner 406.

The data extractor 402 may be configured to collect involved or generated in different layers of the computing process 100. The data may be categorized or labeled based on the type and the layers. In other words, data of a same type in a same layer may be grouped together or labeled as a category.

The data analyzer 404 may be configured to statistically analyze the categories of floating-point numbers to determine a data range for the data in each category and a distribution pattern of the data in each category over one or more subranges of the data range.

For example, with respect to the input neuron data 102A in the $i^{th}$ layer, the floating-point number analyzing processor 302 may determine that the data are within a range, e.g., between $1.0\times 2^{-4}$ and $1.0\times 2^4$. The range may further include subranges such as from $1.0\times 2^{-4}$ to $1.0\times 2^{-3}$. In some example, the floating-point number analyzing processor 302 may be configured to calculate the percentile of data within each subrange, e.g., 99.6% of the input neuron data 102A are between $1.0\times 2^{-4}$ and $1.0\times 2^{-3}$.

Figure 5A:
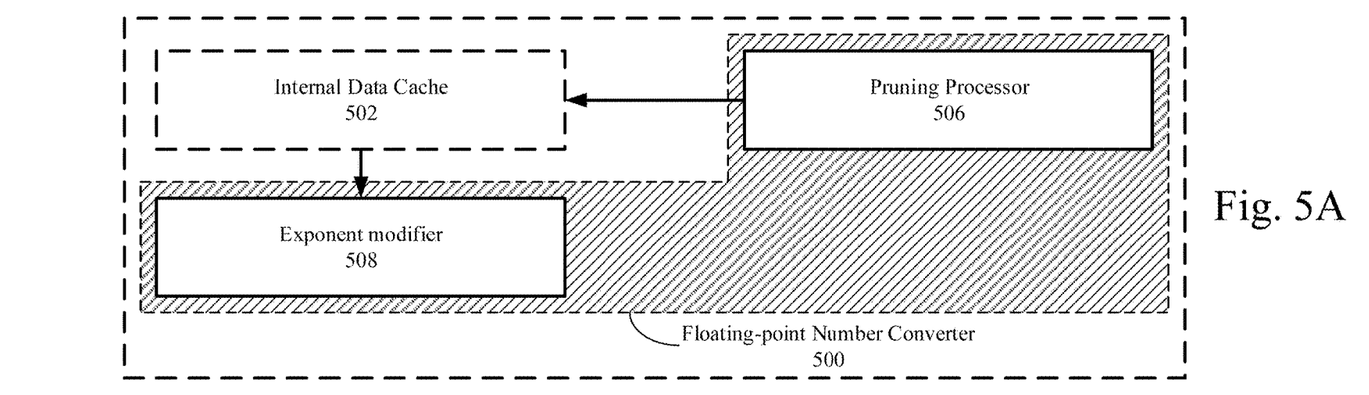
FIG. 5A is a block diagram illustrating an example forward propagation module by which the example forward propagation process may be implemented.

The format determiner 406 may be configured to determine a format for each category of the data such that floating-point numbers in accordance with the format can represent at least a predetermined percentage of the category of data. For example, the predetermined percentage may be preset as 99.5%. Thus, the bit lengths of the exponent field and the mantissa field may be adjusted such that shortened floating-point numbers in the determined format may represent at least 99.5% of the input neuron data 102A. FIG. 5A is a block diagram illustrating an example forward propagation module by which the example forward propagation process may be implemented.

As depicted, the example forward propagation module may include an internal data cache 502 and a floating-point converter 500. The internal data cache 502 may be configured to store one or more intermediate results generated during the forward propagation process. One or more process results of the forward propagation process may also be stored in the internal data cache 502.

The floating-point number converter 500 may include a pruning processor 506 and an exponent modifier 508. The pruning processor 506 may be configured to adjust the mantissa field of the process results. In some examples, the intermediate results may not be affected by the pruning processor 506.

Further, the process results with the adjusted mantissa field may be transmitted to the exponent modifier 508. As previously described, the process results may also be labeled or categorized into different category. With respect to one category of process results, the exponent modifier 508 may be configured to adjust the exponent field of the process results in accordance with the length limit of exponent field included in a format determined for the category of data. As such, the process results of the forward propagation process may be converted to shortened floating-point numbers.

In the context of forward propagation process as illustrated by FIG. 1, the process results may be output to a next layer of operations as input data, e.g., input neuron data 106A.

Figure 5B:
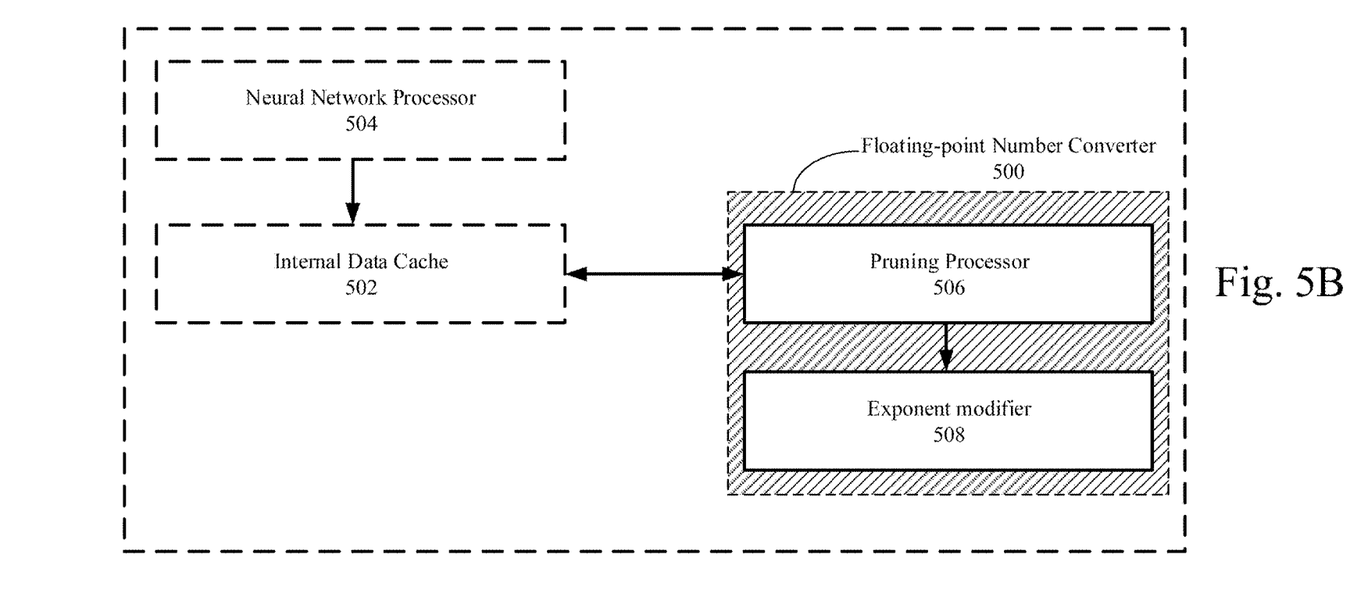
FIG. 5B is a block diagram illustrating another example forward propagation module by which the example forward propagation process may be implemented.

FIG. 5B is a block diagram illustrating another example forward propagation module by which the example forward propagation process may be implemented.

As depicted, the example forward propagation module may include a neural network processor 504 configured to perform neural network operations described in accordance with FIG. 1. Intermediate results and process results of the forward propagation process may be output to and temporarily stored in the internal data cache 502. The process results may be further transmitted to the pruning processor 506.

The pruning processor 506 may be configured to adjust the mantissa field of the process results. The process results with the adjusted mantissa field may be cached or temporarily stored in the internal data cache 502 or transmitted to the exponent modifier 508 for further processing.

The exponent modifier 508 may be configured to adjust the exponent field of the process results in accordance with the length limit of exponent field included in a format determined for the category of data. In some examples, the exponent modifier 508 may be configured to discard bits in the exponent field that exceeds the bit length of the adjusted exponent field in accordance with the determined format.

Figure 6:
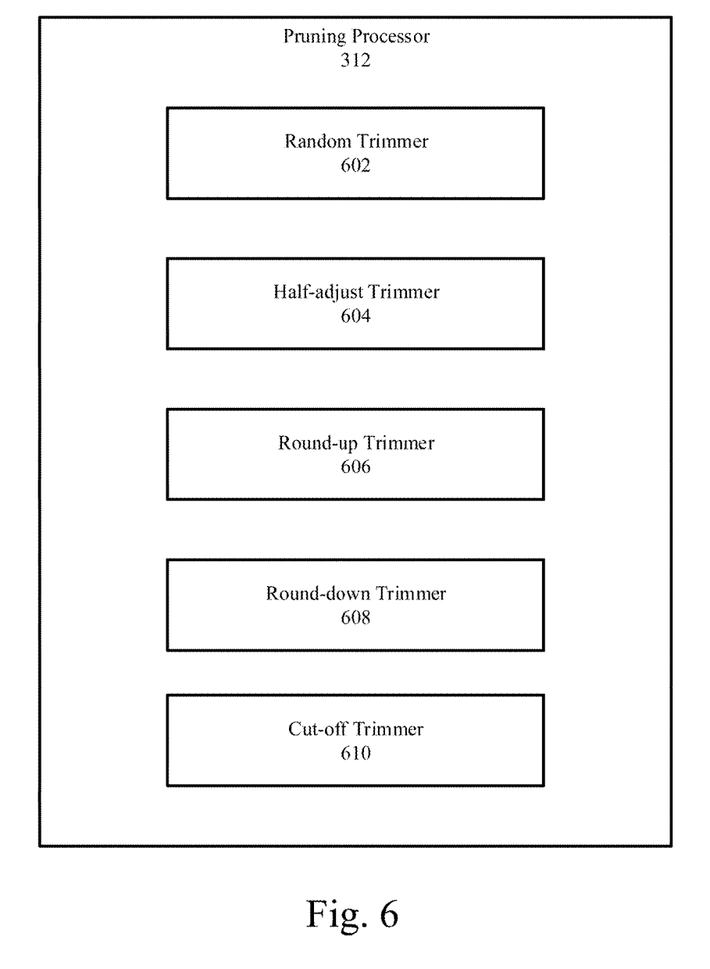
FIG. 6 is a block diagram illustrating an example pruning processor by which the example forward propagation process may be implemented.

FIG. 6 is a block diagram illustrating an example pruning processor 312 by which the example forward propagation process may be implemented.

As depicted, the example pruning processor 312 may include one or more trimmers such as a random trimmer 602, a half-adjust trimmer 604, a round-up trimmer 606, a round-down trimmer 608, a cut-off trimmer 610, etc. The above trimmers may each include one or more bitwise assignment operators configured to manage the bits of floating-point numbers. The trimmers may be implemented by hardware, software, firmware, or any combination thereof.

The random trimmer 602 may be configured to adjust the length of the mantissa field of the process results to a first length in accordance with a first probability and adjust the length of the mantissa field of the process results to a second length in accordance with a second probability. For example, the random trimmer 602 may be configured to adjust the length of the mantissa field in accordance with the following equation:

$$y = \begin{cases} \lfloor x \rfloor & w.p.\ 1 - \frac{x - \lfloor x \rfloor}{\varepsilon} \\ \lfloor x \rfloor + \varepsilon & w.p.\ \frac{x - \lfloor x \rfloor}{\varepsilon} \end{cases},$$

in which y represents the adjusted mantissa, x represents the mantissa of the process results, $\varepsilon$ represents a smallest positive integer that the format of the shortened floating-point numbers can represent, $\lfloor x \rfloor$ represents a mantissa obtained by selecting a number of most significant bits from the mantissa of the process results, the number of the most significant bits being the bit length of the adjusted mantissa field M', w.p. represents the probability of assigning a value as the adjusted mantissa. That is, the probability of assigning $\lfloor x \rfloor$ as the adjusted mantissa is $$1 - \frac{x - \lfloor x \rfloor}{\varepsilon}$$

and the probability of assigning $\lfloor x \rfloor + \varepsilon$ as the adjusted mantissa is $$\frac{x - \lfloor x \rfloor}{\varepsilon}.$$

The half-adjust trimmer 604 may be configured to add an integer value to the mantissa field if a fraction indicated by the mantissa field is not less than one-half of a smallest positive integer representable by the format of the shortened floating-point numbers, wherein the integer value is equal to the smallest positive integer representable by the format of the shortened floating-point numbers. If the fraction is less than one-half of the smallest positive integer representable by the format of the shortened floating-point numbers, the half-adjust trimmer 604 may be configured to clear the fraction indicated by the mantissa field of the process results. In some examples, the half-adjust trimmer 604 may be configured to adjust the mantissa of the process results in accordance with the following equation:

$$y = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases},$$

in which y represents the adjusted mantissa, x represents the mantissa of the process results, $\varepsilon$ represents a smallest positive integer that the format of the shortened floating-point numbers can represent, $\lfloor x \rfloor$ represents an integer multiple of $\varepsilon$, of which the value is the maximum number less than or equal to x. In some examples, $\varepsilon$ may be determined as $2^{offset-(X-1-EL)}$, in which X represents the total bit length of the shortened floating-point numbers, EL represents the bit length of the exponent field of the shortened floating-point numbers, offset represents the offset value determined by the format of the shortened floating-point numbers.

The round-up trimmer 606 may be configured to round up the mantissa field to a smallest positive integer that is greater than the process result. For example, the round-up trimmer 606 may be configured to adjust the mantissa of the process results in accordance with the following equation: $y=\lceil x \rceil$, in which y represents the adjusted mantissa, x represents the mantissa of the process results, $\lceil x \rceil$ represents an integer multiple of ε, of which the value is the minimum number greater than or equal to x. In some examples, c may be determined as $2^{\textit{offset}-(X-1-EL)}$, in which X represents the total bit length of the shortened floating-point numbers, EL represents the bit length of the exponent field of the shortened floating-point numbers, offset represents the offset value determined by the format of the shortened floating-point numbers.

The round-down trimmer 608 may be configured to round down the mantissa field to a greatest positive integer that is less than the process result. For example, the round-down trimmer 608 may be configured to adjust the mantissa of the process results in accordance with the following equation: $y=\lfloor x \rfloor$, in which y represents the adjusted mantissa, x represents the mantissa of the process results, $\lfloor x \rfloor$ represents an integer multiple of ε, of which the value is the maximum number less than or equal to x. In some examples, ε may be determined as $2^{\textit{offset}-(X-1-EL)}$, in which X represents the total bit length of the shortened floating-point numbers, EL represents the bit length of the exponent field of the shortened floating-point numbers, offset represents the offset value determined by the format of the shortened floating-point numbers.

The cut-off trimmer 610 may be configured to discard mantissa digits that exceed a length of a mantissa field in accordance with the at least one format of shortened floating-point numbers. In an example where the format of the shortened floating-point numbers indicates an adjusted mantissa field, the cut-off trimmer 610 may be configured to select one or more most significant bits from the mantissa of the process results. The count of the one or more most significant bits may be equal to the bit length of the adjusted mantissa field.

Figure 7:
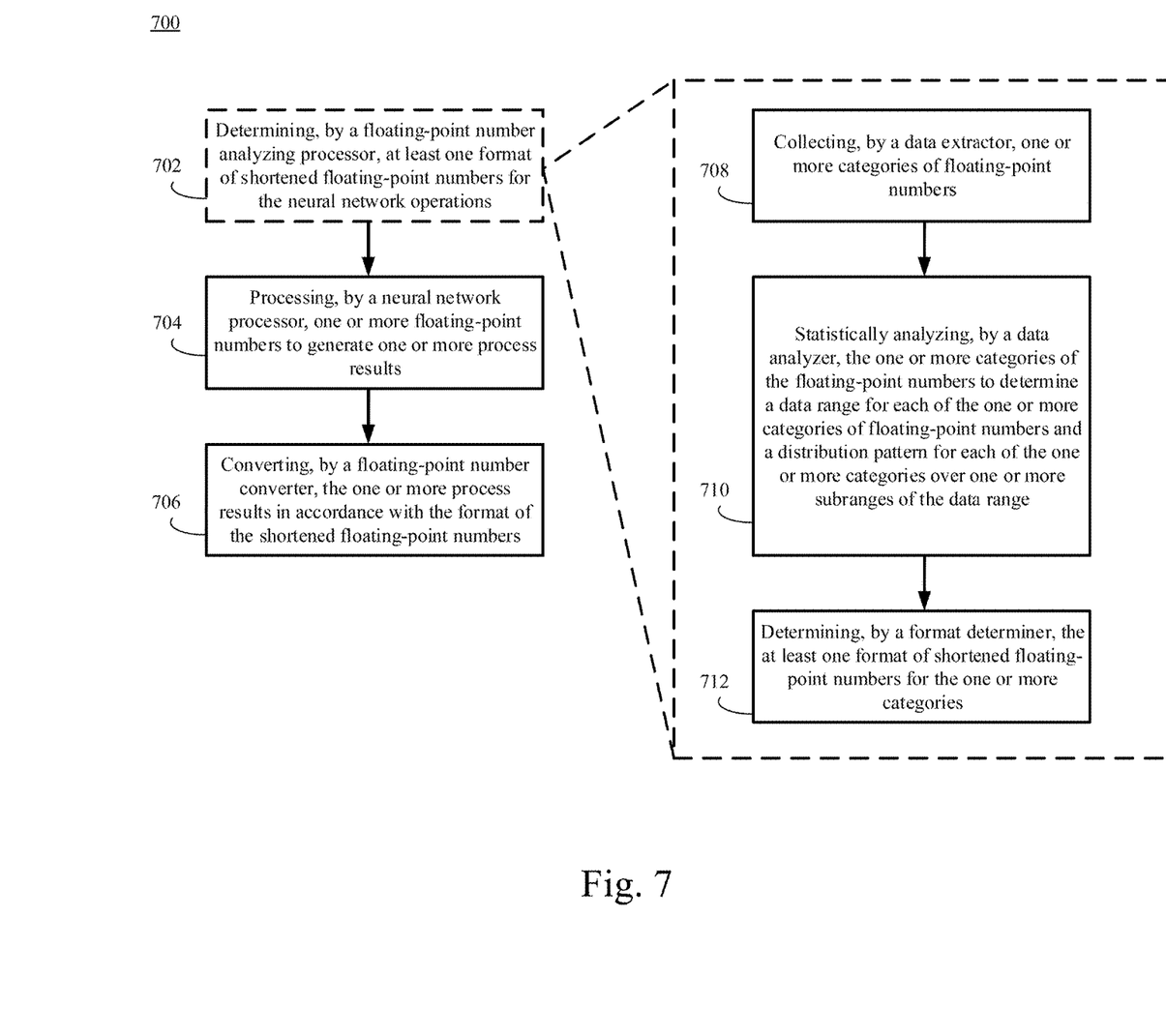
FIG. 7 is a flow chart illustrating an example method for converting floating-point numbers in a neural network.

FIG. 7 is a flow chart illustrating an example method 700 for converting floating-point numbers in a neural network. The example method 700 may be performed by one or more components described in accordance with FIGS. 3, 4, 5A, 5B, and 6. Optional operations may be indicated by dash-lined blocks.

At block 702, the example method 700 may optionally include determining, by a floating-point number analyzing processor, at least one format of shortened floating-point numbers for the neural network operations. For example, the floating-point number analyzing processor 302 may be configured to determine a format for each category of the data involved in the forward propagation process. Block 702 may further include block 708, block 710, and block 712.

At block 708, the example method 700 may include collecting, by a data extractor, one or more categories of floating-point numbers. For example, the data extractor 402 of the floating-point number analyzing processor 302 may be configured to collect involved or generated in different layers of the computing process 100. The data may be categorized or labeled based on the type and the layers. In other words, data of a same type in a same layer may be grouped together or labeled as a category.

At block 710, the example method 700 may include statistically analyzing, by a data analyzer, the one or more categories of the floating-point numbers to determine a data range for each of the one or more categories of floating-point numbers and a distribution pattern for each of the one or more categories over one or more subranges of the data range. For example, the data analyzer 404 of the floating-point number analyzing processor 302 may be configured to statistically analyze the categories of floating-point numbers to determine a data range for the data in each category and a distribution pattern of the data in each category over one or more subranges of the data range.

For example, with respect to the input neuron data 102A in the $i^{th}$ layer, the floating-point number analyzing processor 302 may determine that the data are within a range, e.g., between $1.0 \times 2^{-4}$ and $1.0 \times 2^4$. The range may further include subranges such as from $1.0 \times 2^{-4}$ to $1.0 \times 2^{-3}$. In some example, the floating-point number analyzing processor 302 may be configured to calculate the percentile of data within each subrange, e.g., 99.6% of the input neuron data 102A are between $1.0 \times 2^{-4}$ and $1.0 \times 2^2$.

At block 712, the example method 700 may include determining, by a format determiner, the at least one format of shortened floating-point numbers for the one or more categories. For example, the format determiner 406 of the floating-point number analyzing processor 302 may be configured to determine a format for each category of the data such that floating-point numbers in accordance with the format can represent at least a predetermined percentage of the category of data. For example, the predetermined percentage may be preset as 99.5%. Thus, the bit lengths of the exponent field and the mantissa field may be adjusted such that shortened floating-point numbers in the determined format may represent at least 99.5% of the input neuron data 102A. The process may continue to block 704.

At block 704, the example method 700 may include processing, by a neural network processor, one or more floating-point numbers to generate one or more process results. For example, a neural network processor 504 may be configured to perform neural network operations described in accordance with FIG. 1. Intermediate results and process results of the forward propagation process may be output to and temporarily stored in the internal data cache 502.

At block 706, the example method 700 may include converting, by a floating-point number converter, the one or more process results in accordance with the format of the shortened floating-point numbers. For example, the pruning processor 506 may be configured to adjust the mantissa field of the process results and the exponent modifier 508 may be configured to adjust the exponent field of the process results in accordance with the length limit of exponent field included in a format determined for the category of data. In some examples, the exponent modifier 508 may be configured to discard bits in the exponent field that exceeds the bit length of the adjusted exponent field in accordance with the determined format.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. An apparatus for neural network operations, comprising:
   a neural network processor configured to process one or more floating-point numbers to generate one or more process results formatted as regular floating-point numbers;
   a long-to-short (LS) floating-point number converter configured to convert the one or more process results from the regular floating-point numbers in accordance with at least one format of shortened floating-point numbers; and
   a floating-point number analyzing processor configured to determine a length limit of an exponent field of the at least one format of the shortened floating-point numbers according to a category of the floating-point numbers.

2. The apparatus of claim 1, wherein the floating-point number analyzing processor is further configured to determine an offset value and a bias value of the at least one format of the shortened floating-point numbers according to the category of the floating-point numbers.

3. The apparatus of claim 2, wherein the floating-point number analyzing processor comprises:
   a data extractor configured to collect one or more categories of the floating-point numbers;
   a data analyzer configured to statistically analyze the one or more categories of the floating-point numbers to determine a data range for each of the one or more categories of the floating-point numbers and a distribution pattern for each of the one or more categories over one or more subranges of the data range; and
   a format determiner configured to determine the at least one format of shortened floating-point numbers for the one or more categories.

4. The apparatus of claim 1, further comprising a data cache configured to store one or more weight values and one or more bias values of the floating-point numbers formatted as the regular floating-point numbers.

5. The apparatus of claim 1, wherein the LS floating-point number converter comprises:
   a pruning processor configured to adjust a length of a mantissa field of the process results, and
   an exponent modifier configured to adjust a length of an exponent field of the process results in accordance with the at least one format.

6. The apparatus of claim 1, further comprising a forward propagation module configured to perform operations in a forward propagation process to generate one or more forward propagation results.

7. The apparatus of claim 6, further comprising:
   a short-to-long (SL) floating-point number converter configured to convert the propagation results to backpropagation input data formatted as regular floating-point numbers; and
   a backpropagation module configured to perform operations in a backpropagation process based on the backpropagation input data and one or more weight values and one or more bias values stored in a data cache to generate one or more backpropagation results and transmit the one or more backpropagation results to the LS floating-point number converter.

8. The apparatus of claim 1, wherein one or more floating-point numbers are grouped into one or more categories based on a layer that the floating-point numbers correspond to or a type of the floating-point numbers.

9. The apparatus of claim 1, wherein each of the at least one format of shortened floating-point numbers includes a bit length limit of an exponent, a bit length of a mantissa, and an offset value.

10. A method for neural network operations, comprising:
    processing, by a neural network processor, one or more floating-point numbers to generate one or more process results formatted as regular floating-point numbers;
    converting, by a long-to-short (LS) floating-point number converter, the one or more process results from the regular floating-point numbers in accordance with at least one format of shortened floating-point numbers; and
    determining, by a floating-point number analyzing processor, a length limit of an exponent field of the at least one format of the shortened floating-point numbers according to a category of the floating-point numbers.

11. The method of claim 10, further comprising determining, by the floating-point number analyzing processor, an offset value and a bias value of the at least one format of the shortened floating-point numbers according to the category of the floating-point numbers.

12. The method of claim 11, further comprising:
    collecting, by a data extractor of the floating-point number analyzing processor, one or more categories of the floating-point numbers;
    statistically analyzing, by a data analyzer of the floating-point number analyzing processor, the one or more categories of the floating-point numbers to determine a data range for each of the one or more categories of the floating-point numbers and a distribution pattern for each of the one or more categories over one or more subranges of the data range; and
    determining, by a format determiner of the floating-point number analyzing processor, the at least one format of shortened floating-point numbers for the one or more categories.

13. The method of claim 10, further comprising storing, by a data cache, one or more weight values and one or more bias values of the floating-point numbers formatted as the regular floating-point numbers.

14. The method of claim 10, further comprising:
adjusting, by a pruning processor of the LS floating-point number converter, a length of a mantissa field of the process results, and
adjusting, by an exponent modifier of the LS floating-point number converter, a length of an exponent field of the process results in accordance with the at least one format.

15. The method of claim 10, further comprising performing, by a forward propagation module, operations in a forward propagation process to generate one or more forward propagation results.

16. The method of claim 15, further comprising:
converting, by a short-to-long (SL) floating-point number converter, the propagation results to backpropagation input data formatted as regular floating-point numbers;
performing, by a backpropagation module, operations in a backpropagation process based on the backpropagation input data and one or more weight values and one or more bias values stored in a data cache to generate one or more backpropagation results; and
transmitting, by the backpropagation module, the one or more backpropagation results to the LS floating-point number converter.

17. The method of claim 10, wherein one or more floating-point numbers are grouped into one or more categories based on a layer that the floating-point numbers correspond to or a type of the floating-point numbers.

18. The method of claim 10, wherein each of the at least one format of shortened floating-point numbers includes a bit length limit of an exponent, a bit length of a mantissa, and an offset value.

* * * * *